C. DITTMAN.
Railroad Rail Joint.

No. 168,558.

Patented Oct. 11, 1875.

Witnesses:
H. R. Kochel
Benj. F. Davis

Inventor:
Casper Dittman

UNITED STATES PATENT OFFICE.

CASPER DITTMAN, OF LEACOCK, PENNSYLVANIA.

IMPROVEMENT IN RAILROAD-RAIL JOINTS.

Specification forming part of Letters Patent No. 168,558, dated October 11, 1875; application filed August 21, 1875.

*To all whom it may concern:*

Be it known that I, CASPER DITTMAN, of Leacock, in the county of Lancaster and State of Pennsylvania, have invented certain new and useful Improvements in the Method of Securing Fish-Plates to Railway-Joints, which improvements are fully set forth in the following specification, reference being had to the accompanying drawings.

My improvements relate, first, to a more simple and convenient combination and arrangement of parts for avoiding the injurious effects of the strain and jar caused to fish-plates, bolts, and nuts by the passage of trains over the rails; second, to a combination and arrangement of parts which shall prevent the bolt from turning or working loose in the fish-plates and neck of the rail.

Figure 1:
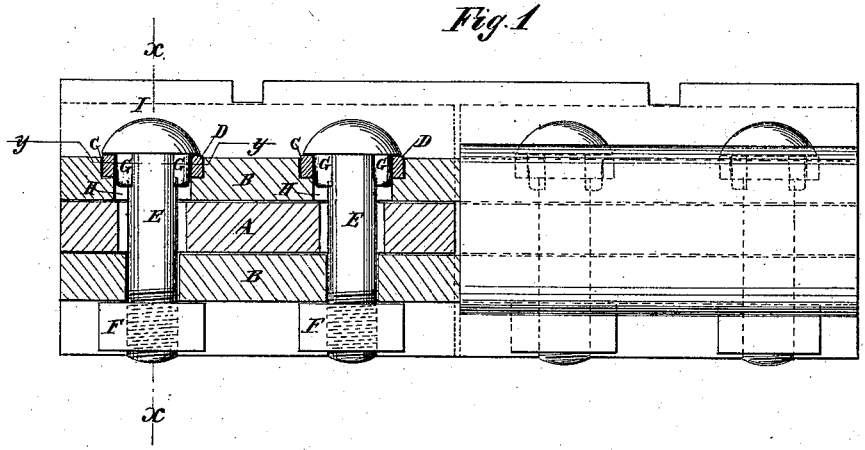
Figure 2:
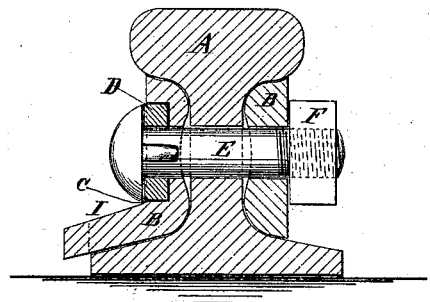
Figure 3:
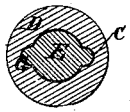

In the drawings serving to illustrate my improvements, Figure 1 is a plan view of a joint, showing the fish-plates, elastic rings, bolts, and nuts connected therewith, the upper surface of the rail being removed. Fig. 2 is a vertical transverse section of the same, taken in the line $x\ x$ of Fig. 1. Fig. 3 is a vertical longitudinal section of the same, taken in the line $y\ y$ of Fig. 1.

A A are the ends of two rails. In the necks of these rails are placed two fish-plates, B B, one on each side. One of these fish-plates is constructed with a series of depressions, C C, &c., in which are inserted rubber rings D D, &c. Through these rings pass the bolts E E, &c., which are secured upon the opposite side by nuts F F, &c. The head of each bolt, impinging as it does upon the rubber ring, or ring of other elastic material placed in the recessed fish-plate, all injurious effects of the strain and jar upon the fish-plates, bolt, and nut secured on threaded end of the bolt are avoided. To prevent the bolt from turning round there is placed on its shank, near its head, two small wings or flanges, G G, made deep enough to take into the interior oval recess H of the fish-plate when the bolt is drawn into place tightly by the nut.

This construction rigidly secures the bolts in position, so that there is no danger of their turning; and, with the nuts attached thereto, the elastic washers, fish-plates, and the ends of the rails are securely bound to each other; and, with the rubber ring as a cushion to the head of the bolt, the manner in which the elastic substance will take up the yield of the bolt under strain will prevent the nut from turning on the thread of the bolt.

I claim—

1. Recessed fish-plates, substantially as described, in combination with elastic rings placed within such recesses, and bolts which pass through the rings, with the heads resting upon the elastic rings, so as to avoid all injurious effects of the strain and jar upon the fish-plates, bolts, and nuts.

2. Recessed fish-plates, substantially as described, in combination with elastic rings placed within such recesses, and flanged bolts which pass through the rings and interior oval recesses of the fish-plates, and bind the elastic rings, fish-plates, and the ends of the rails to each other by the aid of the bolt-heads and nuts.

CASPER DITTMAN.

Witnesses:
A. R. KOCHEL,
BENJ. F. DAVIS.